(12) United States Patent
White et al.

(10) Patent No.: US 8,861,147 B2
(45) Date of Patent: Oct. 14, 2014

(54) FAULT PROTECTION FOR AIRCRAFT POWER SYSTEMS

(75) Inventors: Jeffrey Joseph White, Shoreline, WA (US); Evelyn M. Matheson, Bothell, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 13/455,954

(22) Filed: Apr. 25, 2012

(65) Prior Publication Data

US 2013/0286515 A1    Oct. 31, 2013

(51) Int. Cl.
    *H02H 7/00*    (2006.01)
(52) U.S. Cl.
    USPC .......................................................... 361/42
(58) Field of Classification Search
    USPC .......................................................... 361/42
    See application file for complete search history.

(56) References Cited

U.S. PATENT DOCUMENTS

| | | | |
|---|---|---|---|
| 3,634,729 A * | 1/1972 | Hendry et al. | 361/96 |
| 4,973,902 A | 11/1990 | Dhyanchand et al. | |
| 5,805,394 A * | 9/1998 | Glennon | 361/20 |
| 6,625,550 B1 | 9/2003 | Scott et al. | |
| 7,253,640 B2 | 8/2007 | Engel et al. | |
| 7,489,138 B2 | 2/2009 | Yu et al. | |
| 7,564,662 B2 | 7/2009 | Zhang et al. | |
| 7,646,572 B2 | 1/2010 | Mills et al. | |
| 2002/0149891 A1 * | 10/2002 | Neiger et al. | 361/42 |
| 2010/0259859 A1 | 10/2010 | Prabhu et al. | |
| 2010/0284114 A1 | 11/2010 | Kilroy et al. | |
| 2011/0031942 A1 | 2/2011 | Green | |
| 2011/0037323 A1 | 2/2011 | Buerer | |
| 2013/0286513 A1 | 10/2013 | Holley et al. | |

OTHER PUBLICATIONS

Holley et al., "Combined Subtransient Current Suppression and Overvoltage Transient Protection," U.S. Appl. No. 14/058,752, filed Oct. 21, 2013, 53 pages.
Office Action, dated Feb. 27, 2014, regarding U.S. Appl. No. 13/457,061, 14 pages.

* cited by examiner

*Primary Examiner* — Jared Fureman
*Assistant Examiner* — Kevin J Comber
(74) *Attorney, Agent, or Firm* — Yee & Associates, P.C.

(57) ABSTRACT

A system and method for protecting a power system. A generator is tripped in response to identifying a current on the generator that is greater than a first current threshold for a first time delay. The generator is also tripped in response to identifying the current on the generator that is greater than a second current threshold for a second time delay. The first current threshold is larger than the second current threshold and the first time delay is shorter than the second time delay.

22 Claims, 5 Drawing Sheets

FAULT PROTECTION FOR AIRCRAFT POWER SYSTEMS

BACKGROUND INFORMATION

1. Field

The present disclosure relates generally to electrical power systems, such as systems for generating and distributing electrical power on an aircraft. The present disclosure relates more specifically to identifying undesired conditions, such as arc faults, in such power systems and protecting such systems from such undesired conditions in a coordinated manner.

2. Background

Aircraft may employ various electronic devices and systems to perform various functions on the aircraft. Power for the electronic devices and systems on an aircraft may be provided by an aircraft power system. The aircraft power system may include a number of generators along with various power distribution and conversion systems. For example, a number of generators may be driven by the aircraft engines. Feeder lines may carry generated power from the generators to the various power distribution and conversion systems.

Power conversion systems on aircraft may include, for example, rectifiers and transformers. Rectifiers may be used to provide direct current (DC) power from the alternating current (AC) power provided by the generators. Transformers may be used to provide various levels of AC and DC power. Power distribution systems on aircraft may include AC and DC buses and various feeder lines for carrying power between the buses and between the buses and various loads on the aircraft.

It is desirable to protect the components of an aircraft power system from undesirable conditions that may occur on the power system. An example of such an undesirable condition is a fault condition that results in an arcing event. An arc fault is a discharge of electricity between two or more conductors. This discharge releases heat, which may break down insulation and possibly trigger an electrical fire. The strength and duration of arc faults may be highly variable. For example, an arc fault may be caused in an aircraft power system by debris entering a power panel or another part of the power system.

Traditional commercial aircraft typically employ relatively low voltage, fixed frequency power systems. Such systems are relatively less susceptible to arc faults. Testing has shown that it is relatively difficult to establish arcs in traditional aircraft power systems. Protection from faults in such power systems may be implemented using current transformers. All bus and load distribution wiring may be fed through these current transformers.

Modern aircraft power systems may operate at higher voltage and frequency levels than traditional aircraft power systems. For example, voltages may be greater than 115 Vrms AC or DC and frequencies may be greater than 400 Hz. Due to the differences between traditional aircraft power systems and more modern systems, the methods for providing power system protection in traditional systems may not be used to provide the desired protection for more modern aircraft power systems.

Accordingly, it would be desirable to have a method and apparatus that takes into account one or more of the issues discussed above as well as possibly other issues.

SUMMARY

An embodiment of the present disclosure provides a method for protecting a power system. A generator is tripped in response to identifying a current on the generator that is greater than a first current threshold for a first time delay. The generator is also tripped in response to identifying the current on the generator that is greater than a second current threshold for a second time delay. The first current threshold is larger than the second current threshold and the first time delay is shorter than the second time delay.

Another embodiment of the present disclosure provides an apparatus comprising a power system protection controller. The power system protection controller is configured to trip a generator in response to identifying a current on the generator that is greater than a first current threshold for a first time delay and to trip the generator in response to identifying the current on the generator that is greater than a second current threshold for a second time delay. The first current threshold is larger than the second current threshold and the first time delay is shorter than the second time delay.

Another embodiment of the present disclosure provides a method for protecting a power system. A generator provides power for the power system. A current on a generator that is greater than a first current threshold is identified. A shorter time delay is selected for a time delay in response to identifying a manual reset of a fault in the power system, otherwise a longer time delay is selected for the time delay. The longer time delay is longer than the shorter time delay. The generator is tripped in response to identifying the overcurrent on the generator that is greater than the first current threshold for more than the time delay.

The features and functions of the embodiments can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that it is desirable to provide safe operation of a power system on an aircraft in the event that undesired conditions occur in the power system. The different illustrative embodiments also recognize and take into account that it is desirable to provide robust and coordinated protection for aircraft power systems.

The different illustrative embodiments recognize and take into account that it is desirable to have robust aircraft power system protection. It is desirable that normal transients in the power system should not cause power to the loads to be interrupted. Therefore, it is desirable that such normal transients should not cause false indications of undesirable conditions in the power system.

The different illustrative embodiments also recognize and take into account that protection of the power system on an aircraft should be coordinated. Causes of undesired conditions in the power system upstream, or closer to the generator, from where the undesired condition is detected should not result in power being cut off to the loads at a point in the power system downstream, or further from the generator, from where the undesired condition is detected. Furthermore, it is desirable that when the cause of an undesired condition in the power system is downstream from where the undesired condition is detected, appropriate action should be taken within the power system at a point close to the cause of the undesired condition. By taking appropriate action at a point close to the cause of the undesired condition, the undesired condition may be isolated without affecting other parts of the power system unnecessarily.

The different illustrative embodiments recognize and take into account that modern aircraft power systems may operate at higher voltage and frequency levels than traditional aircraft power systems. Such power systems operating at higher voltage and frequency levels may be more susceptible to arc faults.

The different illustrative embodiments recognize and take into account that arc faults typically may release significant energy, and are generally intermittent in nature. As a result, arc faults may be relatively difficult to detect and isolate.

The different illustrative embodiments recognize and take into account that fault protection in traditional aircraft power systems may be implemented using current transformers and differential current protection. However, in modern aircraft, with power systems providing higher power levels, feeding more and larger wires through current transformers is more difficult. In accordance with an illustrative embodiment, a system and method are provided for protecting the power system on a modern aircraft that reduces the use of current transformers for bus differential protection.

Figure 1:
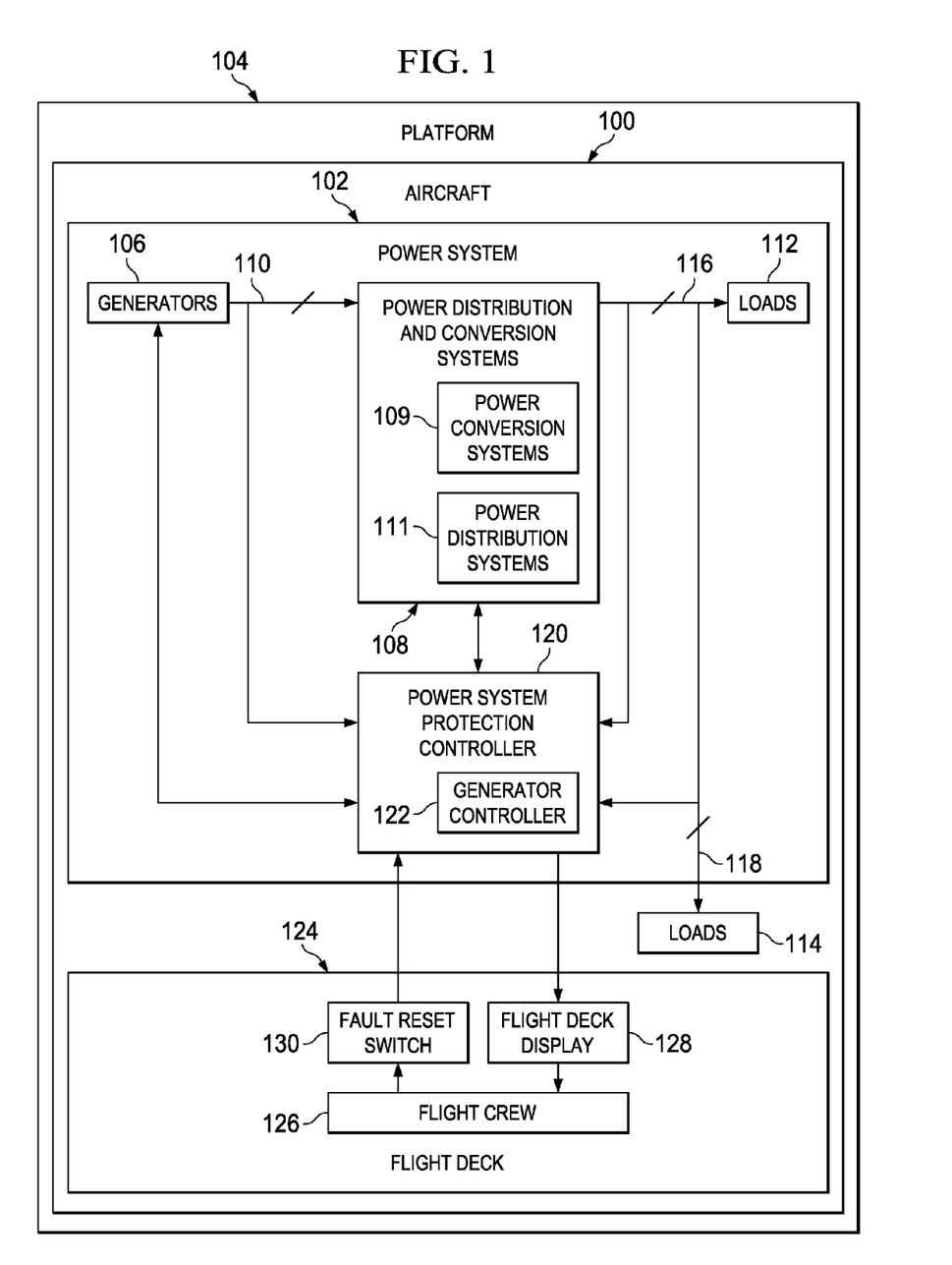
FIG. 1 is an illustration of a block diagram of an aircraft in accordance with an illustrative embodiment.

Turning now to FIG. 1, an illustration of a block diagram of an aircraft is depicted in accordance with an illustrative embodiment. In this example, electric power for aircraft 100 is provided by power system 102.

Aircraft 100 may be any type of aircraft. For example, without limitation, aircraft 100 may include a fixed wing, rotary wing, or lighter than air aircraft. Aircraft 100 may be configured for carrying passengers, cargo, both passengers and cargo, or may be used for performing any other operation or mission. Aircraft 100 may be operated by an airline, a military unit, or any other private or governmental entity.

Aircraft 100 is an example of platform 104 in which illustrative embodiments may be implemented. Arc fault protection, in accordance with an illustrative embodiment, may be provided for power system 102 on or for any type of platform 104 other than aircraft 100. For example, without limitation, platform 104 may be any vehicle that is configured for traveling through the air, in space, on land, on the surface of water, underwater, or in any other operating environment or combination of environments.

Arc fault protection, in accordance with an illustrative embodiment, may be provided for power system 102 on or for any type of platform 104 other than a vehicle. For example, platform 104 may include any fixed or movable structure that may be provided with electrical power by power system 102.

Power system 102 includes generators 106 and power distribution and conversion systems 108. For example, generators 106 may be driven by operation of the engines of aircraft 100. For example, without limitation, generators 106 may generate variable frequency three-phase AC power. Feeder lines 110 carry the generated AC power from generators 106 to power distribution and conversion systems 108.

Power distribution and conversion systems 108 may include power conversion systems 109 and power distribution systems 111. Power conversion systems 109 may include devices and systems that are configured to convert the AC power provided by generators 106 on feeder lines 110 to electrical power for loads 112 and 114. For example, without limitation, power conversion systems 109 may include rectifiers, transformers, rectifiers and transformers, other electrical power conversion devices or systems, or any combination of electrical power conversion devices or systems. Rectifiers may be used to provide DC power from the AC power provided by generators 106. Transformers may be used to provide various levels of AC power. Transformers in combination with rectifiers may be used to provide various levels of DC power.

Power distribution systems 111 may include structures for distributing the electrical power to loads 112 and 114. Power distribution systems 111 also may include a number of AC buses, a number of DC buses, or a number of AC buses and DC buses. Feeder lines may be provided for carrying power between the buses in power distribution and conversion systems 108 and between the buses in power distribution and conversion systems 108 and loads 112 and 114. For example, feeder lines 116 and 118 may carry power from power distribution and conversion systems 108 to loads 112 and 114, respectively.

Loads 112 and 114 may include any electrical device or system on aircraft 100 that uses electrical power. Loads 112 may be part of power system 102. Loads 114 may be part of aircraft 100, or located in or on aircraft 100, but not part of power system 102.

In accordance with an illustrative embodiment, safe operation of power system 102 in the event of undesired conditions in power system 102 is provided by power system protection controller 120. For example, undesired conditions in power system 102 may include arc faults, other undesired conditions, or combinations of undesired conditions. Safe operation is timely removal of an undesired condition.

In accordance with an illustrative embodiment, power system protection controller 120 is configured to identify undesired conditions in power system 102 and to control power system 102 in an appropriate manner in response to identifying undesired conditions in power system 102. For example, without limitation, power system protection controller 120 may be connected to generators 106, power distribution and conversion systems 108, and feeder lines 110, 116, and 118 by appropriate sensors in order to identify undesired conditions in generators 106, power distribution and conversion systems 108, and feeder lines 110, 116, and 118.

Power system protection controller 120 may be connected to appropriate devices in generators 106 and power distribution and conversion systems 108 in order to control power system 102 in an appropriate manner in response to identifying undesired conditions in power system 102. For example, without limitation, power system protection controller 120 may be connected to generators 106 in an appropriate manner so that power system protection controller 120 may turn off generators 106 in response to identifying selected undesired conditions in power system 102. Power system protection controller 120 may be connected to circuit breakers, contactors, or other devices in power distribution and conversion systems 108 in an appropriate manner so that power system protection controller 120 may disconnect or isolate portions of power system 102 in response to identifying selected undesired conditions in power system 102.

Some or all of the functions of power system protection controller 120 may be implemented by generator controller 122. Generator controller 122 may be configured for controlling operation of one or more of generators 106. Generator controller 122 also may be configured to perform a number of functions of power system protection controller 120 to protect generators 106 and other components in power system 102 when undesired conditions are identified in power system 102.

Alternatively, some or all of the functions of power system protection controller 120 may be implemented in a number of devices or systems that are separate from generator controller 122. The functions of power system protection controller 120 as described herein may be implemented by a number of devices or systems that may be distributed at various locations in power system 102.

Aircraft 100 also may include flight deck 124. Flight deck 124 also may be referred to as the cockpit of aircraft 100. Flight deck 124 may include various controls which enable flight crew 126 to control the operation of aircraft 100. For example, without limitation, flight deck 124 may include an area located near the front of aircraft 100. In another example, without limitation, flight crew 126 may include a pilot, a co-pilot, a navigator, other personnel, or various combinations of personnel for controlling the operation of aircraft 100.

Flight deck 124 may include a number of devices or systems for presenting various types of information for use by flight crew 126. For example, without limitation, flight deck 124 may include flight deck display 128. Flight deck display 128 may be configured to indicate to flight crew 126 a status of power system 102 and of any actions taken by power system protection controller 120 to protect power system 102 in response to undesired conditions in power system 102. For example, without limitation, flight deck display 128 may be configured to provide an indication to flight crew 126 when generators 106 are turned off by power system protection controller 120 in response to undesired conditions in power system 102.

In accordance with an illustrative embodiment, fault reset switch 130 may be provided on flight deck 124 for use by flight crew 126. In response to actuation of fault reset switch 130, power system protection controller 120 may attempt to undo selected actions taken by power system protection controller 120 to protect power system 102 in response to undesired conditions in power system 102. For example, without limitation, flight deck display 128 may indicate to flight crew 126 that generators 106 have been turned off in response to undesired conditions in power system 102. In this case, flight crew 126 may attempt to restart generators 106 by actuating fault reset switch 130.

Fault reset switch 130 may be implemented as a physical switch, button, or other physical device that may be actuated by flight crew 126. Alternatively, fault reset switch 130 may be a virtual switch, button, or other user interface that may be part of a graphical user interface that is presented to flight crew 126 on flight deck 124. For example, without limitation, fault reset switch 130 may be provided as part of a graphical user interface that also includes flight deck display 128.

The location of flight deck 124 on aircraft 100, the composition of flight crew 126, the number and types of devices and systems used to implement displays on flight deck 124, and the types of information presented to flight crew 126 on such displays may depend on various factors including, for example, without limitation, the type of aircraft 100, the operations to be performed by aircraft 100, specific flight or mission requirements, or other factors or various combinations of factors.

In cases where illustrative embodiments are implemented on platform 104 other than aircraft 100, the display of power system protection information that is presented on flight deck display 128 in an aircraft and fault reset switch 130 may be provided in one or more areas or locations on platform 104, or connected to platform 104, where operations for monitoring and control of power system 102 may be performed. For example, without limitation, the display of power system protection information and fault reset switch 130 may be provided in a control room or one or more other local or remote locations or combinations of locations from which a human operator may monitor and control power system 102 using the display of power system protection information and fault reset switch 130. In other words, illustrative embodiments may include monitoring and controlling power system 102 using a display of power system protection information and fault reset switch 130 from an area that may not be referred to as a flight deck or a cockpit and by operators that may not be referred to as flight crew.

Figure 2:
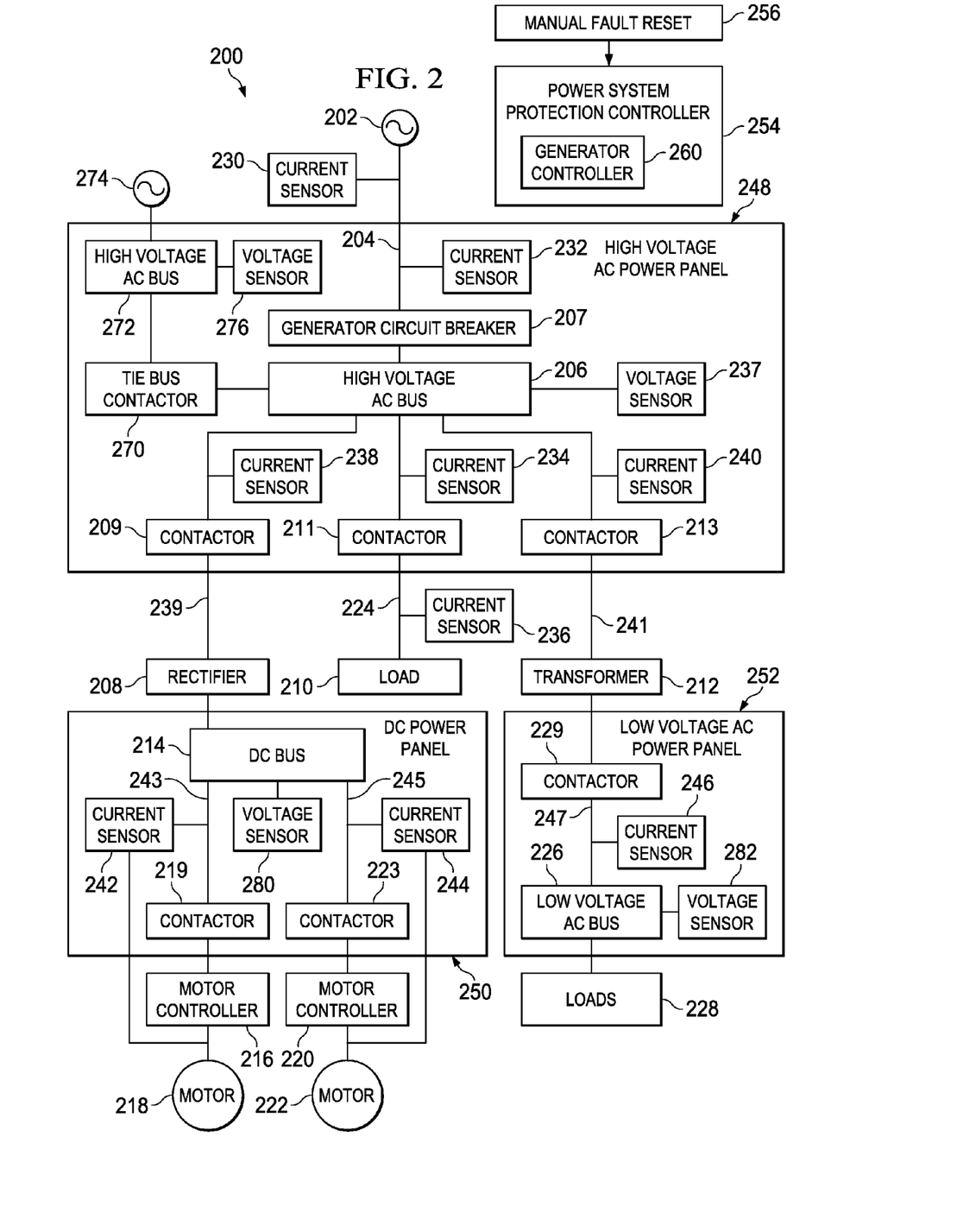
FIG. 2 is an illustration of a block diagram of a power system in accordance with an illustrative embodiment.

Turning now to FIG. 2, an illustration of a block diagram of a power system is depicted in accordance with an illustrative embodiment. In this example, power system 200 is an example of one implementation of power system 102 in FIG. 1.

Power system 200 includes generator 202. For example, generator 202 may be driven by an engine on an aircraft. For example, without limitation, generator 202 may generate variable frequency three-phase AC power. Generator feeder lines 204 carry the generated AC power from generator 202 to high voltage AC bus 206.

Generator circuit breaker 207 may be provided on generator feeder lines 204. Generator circuit breaker 207 may be any device that is configured to disconnect high voltage AC bus 206 from generator 202 when generator circuit breaker 207 is opened.

High voltage AC bus 206 is configured to distribute the relatively high voltage AC power provided by generator 202 to various loads. For example, without limitation, high voltage AC bus 206 may be configured to distribute the relatively high voltage AC power provided by generator 202 to rectifier 208, load 210, and transformer 212.

Contactor 209 may be provided on load feeder line 239 connecting high voltage AC bus 206 to rectifier 208. Contactor 211 may be provided on load feeder line 224 connecting high voltage AC bus 206 to load 210. Contactor 213 may be provided on load feeder line 241 connecting high voltage AC bus 206 to transformer 212. When generator circuit breaker 207 and contactors 209, 211, and 213 are opened, high voltage AC bus 206 is isolated from both generator 202 up-stream from high voltage AC bus 206 and all loads down-stream from high voltage AC bus 206.

Tie bus contactor 270 may be provided between high voltage AC bus 206 and high voltage AC bus 272. For example, high voltage AC bus 272 may be an adjacent or other AC bus that receives power from another generator 274 on the aircraft. In the event that generator 202 or generator feeder line 204 has a fault, tie bus contactor 270 may be closed after generator circuit breaker 207 is opened. Closing tie bus contactor 270 restores power to high voltage AC bus 206, and thus to all of the loads supported by high voltage AC bus 206, from high voltage AC bus 272. Voltage sensor 276 may be configured to identify the voltage on high voltage AC bus 272.

Rectifier 208 is configured to convert the AC power provided by high voltage AC bus 206 to DC power. Rectifier 208 may be any AC to DC power converter. DC power from rectifier 208 may be provided on DC bus 214.

Various DC loads may be powered by the DC power on DC bus 214. For example, without limitation, such DC loads may include motor controller 216, motor 218, motor controller 220, and motor 222. In alternative embodiments, DC loads connected to DC bus 214 may include a single motor and motor controller or more than two motors and motor controllers. In another alternative embodiment, the DC loads connected to DC bus 214 may additionally or alternatively comprise a number of DC loads other than motors and motor controllers.

Motors 218 and 222 may be any type of electric motor. For example, without limitation, motors 218 and 222 may be induction motors, permanent magnet motors, synchronous motors with independent excitation, or any other type of electric motor. Motors 218 and 222 may be the same or different types of motors.

Motor controllers 216 and 220 may be any type of motor controllers that are appropriate for controlling motors 218 and 222, respectively. Depending on the type of motor to be controlled, motor controllers 216 and 220 may be of any appropriate size and complexity. In one example, motor controller 216, motor controller 220, or both may be solid state multifunctional motor controllers that provide power conversion for driving motor 218 or motor 222, respectively. A motor controller of this type may be used to drive various types of motors and motor loads.

Contactor 219 may be provided on load feeder lines 243 connecting DC bus 214 to motor controller 216 and motor 218. Contactor 219 may be configured to disconnect motor controller 216 and motor 218 from DC bus 214 when contactor 219 is opened. Contactor 223 may be provided on load feeder lines 245 connecting DC bus 214 to motor controller 220 and motor 222. Contactor 223 may be configured to disconnect motor controller 220 and motor 222 from DC bus 214 when contactor 223 is opened.

Load 210 may be any number AC loads. Load feeder lines 224 may carry AC power from high voltage AC bus 206 to load 210. Load 210 may include motors, motor controllers, or other AC loads or combinations of AC loads.

In this example, transformer 212 is configured to convert the relatively high voltage AC power on high voltage AC bus 206 to lower voltage AC power. The lower voltage AC power may be provided from transformer 212 to low voltage AC bus 226. AC power may be distributed from low voltage AC bus 226 to loads 228. Loads 228 may be any number of AC loads. For example, without limitation, loads 228 may include single phase AC loads, three phase AC loads, or both.

Contactor 229 may be provided on load feeder lines 247 connecting low voltage AC bus 226 to transformer 212. Contactor 229 may be configured to disconnect low voltage AC bus 226 from transformer 212 when contactor 229 is opened.

In this example, current sensor 230 may be configured to identify the current at a first point on generator feeder lines 204. For example, the first point on generator feeder lines 204 may be a location on generator feeder lines 204 that is at or near generator 202. Current sensor 232 may be configured to identify the current at a second point on generator feeder lines 204. For example, the second point on generator feeder lines 204 may be a location on generator feeder lines 204 that is at or near high voltage AC bus 206. By identifying a difference in the currents identified by current sensor 230 and current sensor 232, a differential current on generator feeder lines 204 may be identified. A differential current on generator feeder lines 204 may indicate an arc fault or other undesired condition on generator feeder lines 204.

In this example, current sensor 234 may be configured to identify the current at a first point on load feeder lines 224. For example, the first point on load feeder lines 224 may be a location on load feeder lines 224 that is at or near high voltage AC bus 206. Current sensor 236 may be configured to identify the current at a second point on load feeder lines 224. For example, the second point on load feeder lines 224 may be a location on load feeder lines 224 that is at or near load 210. By identifying a difference in the currents identified by current sensor 234 and current sensor 236, a differential current on load feeder lines 224 may be identified. A differential current on load feeder lines 224 may indicate an arc fault or other undesired condition on load feeder lines 224.

Voltage sensor 237 may be configured to identify the voltage on high voltage AC bus 206. Current sensor 238 may be configured to identify the current on load feeder lines 239 connecting high voltage AC bus 206 to rectifier 208. Current sensor 240 may be configured to identify the current on load feeder lines 241 connecting high voltage AC bus 206 to transformer 212. Voltage sensor 280 may be configured to identify the voltage on DC bus 214. Current sensor 242 may be configured to identify the current on load feeder lines 243 connecting DC bus 214 to motor controller 216. Alternatively, or in addition, current sensor 242 may be configured to identify the current between motor controller 216 and motor 218. Current sensor 244 may be configured to identify the current on load feeder lines 245 connecting DC bus 214 to motor controller 220. Alternatively, or in addition, current sensor 244 may be configured to identify the current between motor controller 220 and motor 222. Current sensor 246 may be configured to identify the current on load feeder lines 247 connecting transformer 212 to low voltage AC bus 226. Voltage sensor 282 may be configured to identify the voltage on low voltage AC bus 226.

In this example, high voltage AC bus 206, generator circuit breaker 207, contactor 209, contactor 211, contactor 213, current sensor 234, voltage sensor 237, current sensor 238, and current sensor 240 may be included in high voltage AC power panel 248. DC bus 214, contactor 219, contactor 223, current sensor 242, and current sensor 244 may be included in DC power panel 250. Low voltage AC bus 226, contactor 229, and current sensor 246 may be included in low voltage AC power panel 252.

Power system protection controller 254 may be connected to the various current and voltage sensors in power system 200. Power system protection controller 254 may be configured to identify various undesired conditions in power system 200 from the data provided by these sensors. Power system protection controller 254 also may be connected to generator 202, generator circuit breaker 207, and the various contactors in power system 200. Power system protection controller 254 may be configured to trip generator 202, open generator circuit breaker 207, and open the various contactors in power system 200 as appropriate to protect power system 200 when an undesired condition is identified in power system 200. Power system protection controller 254 also may be configured to close tie bus contactor 270 after generator circuit breaker 207 is opened, thereby restoring power to high voltage AC bus 206 from high voltage AC bus 272.

Manual fault reset 256 also may be provided to power system protection controller 254. Manual fault reset 256 may comprise a signal that is provided to system protection controller to indicate that a manual reset of a fault in power system 200 was initiated. For example, manual fault reset 256 may be initiated by a member of the flight crew actuating a fault reset switch provided on the flight deck of an aircraft.

Some or all of the functions of power system protection controller 254 may be implemented by generator controller 260. Generator controller 260 may be configured for controlling operation of generator 202. Generator controller 260 also may be configured to perform a number of functions of power system protection controller 254 to protect generator 202 and other components in power system 200 when undesired conditions are identified in power system 200.

Alternatively, some or all of the functions of power system protection controller 254 may be implemented in a number of devices or systems that are separate from generator controller 260. The functions of power system protection controller 254 as described herein may be implemented by a number of devices or systems that may be distributed at various locations in power system 200.

The illustrations of FIG. 1 and FIG. 2 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, the functions performed by power system protection controller 120 in FIG. 1 or by power system protection controller 254 in FIG. 2 may be implemented in a centralized manner at one location in a power system or may be implemented in a distributed manner at various locations in a power system. Some or all of the functions performed by power system protection controller 120 or power system protection controller 254 may be implemented along with other control functions performed at various locations in the power system. For example, without limitation, some or all of the functions performed by power system protection controller 120 may be implemented as part of generator controller 122 in FIG. 1. Some or all of the functions performed by power system protection controller 254 may be implemented as part of generator controller 260 in FIG. 2.

The functions performed by power system protection controller 120 or by power system protection controller 254 as described herein may be implemented in hardware or in hardware and software. In cases where the functions performed by power system protection controller 120 or power system protection controller 254 are implemented in hardware and software, power system protection controller 120 or power system protection controller 254 may include a programmable processor unit for running the software to perform the functions. For example, without limitation, the processor unit may be a microprocessor, other processor unit, or a combination of processor units. Such a processor unit may be provided in either a general or special purpose computer or other computing device.

The processor unit may serve to run instructions for software that may be loaded into memory, persistent storage, or both. The processor unit may be a number of processors, a multi-processor core, or some other type of processor, depending on the particular implementation. Further, the processor unit may be implemented using a number of heterogeneous processor systems in which a main processor is present with secondary processors on a single chip. As another illustrative example, the processor unit may be a symmetric multi-processor system containing multiple processors of the same type.

The processes of the different embodiments may be performed by the processor unit using software in the form of computer-implemented instructions. Instructions for controlling the processor unit to perform the desired functions in accordance with illustrative embodiments may be located in storage devices which are in communication with the processor unit. For example, without limitation, the instructions may be in a functional form on persistent storage. These instructions may be loaded into memory for execution by the processor unit.

These instructions may be referred to as program instructions, program code, computer usable program code, or computer readable program code that may be read and executed by the processor unit. The program code in the different embodiments may be embodied on different physical or computer readable storage media, such as memory or persistent storage.

In another illustrative example, the functionality of power system protection controller 120 or of power system protection controller 254 may be implemented in a hardware unit that has circuits that are manufactured or configured for a particular use. This type of hardware may perform operations without needing program code to be loaded into a memory from a storage device to be configured to perform the operations.

For example, without limitation, such a hardware unit may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code may be omitted, because the processes for the different embodiments are implemented in a hardware unit.

In still another illustrative example, the functionality provided by power system protection controller 120 or by power system protection controller 254 may be implemented using a combination of processors found in computers and hardware units. Power system protection controller 120 or power system protection controller 254 may include a number of hardware units and a number of processors that are configured to perform the desired functions. In this example, some of the functionality provided by power system protection controller 120 or by power system protection controller 254 may be implemented in the number of hardware units while other processes may be implemented in the number of processors.

In yet another illustrative example, the functionality provided by power system protection controller 120 or by power system protection controller 254 may be implemented using discrete circuit components, either alone or in combination with hardware units, processor units, or both.

Figure 3:
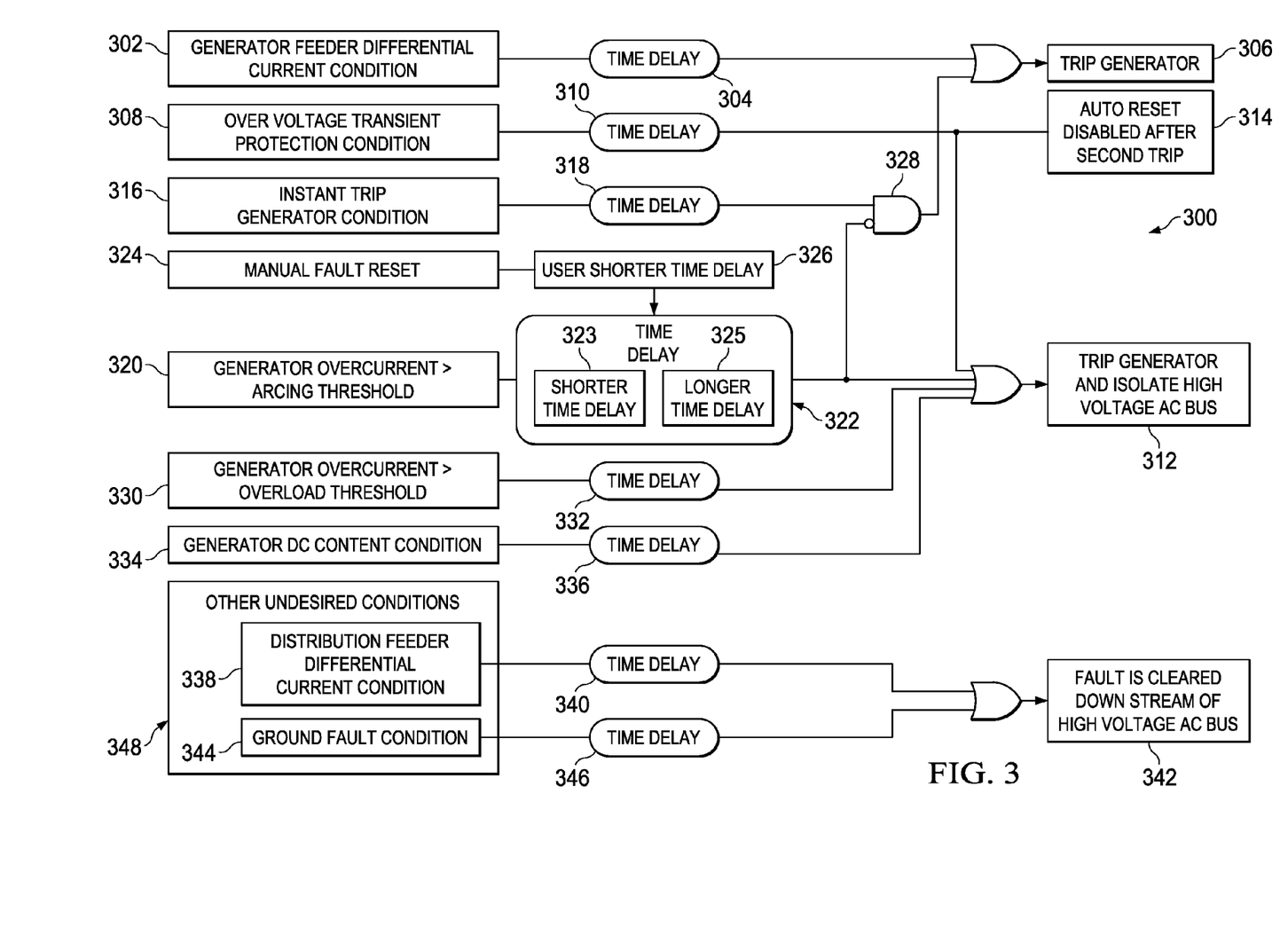
FIG. 3 is an illustration of a logic diagram for power system protection control in accordance with an illustrative embodiment.

Turning now to FIG. 3, an illustration of a logic diagram for power system protection control is depicted in accordance with an illustrative embodiment. In this example, power system protection control logic 300 is an example of one implementation of power system protection control logic that may be implemented in power system protection controller 120 to protect power system 102 in FIG. 1 or in power system protection controller 254 to protect power system 200 in FIG. 2.

Generator feeder differential current condition 302 may be identified when different current levels are detected at two points on the generator feeder lines providing power from the generator. For example, without limitation, generator feeder differential current condition 302 may be identified by comparing current measured at the generator with current measured at an input to the main distribution point in the power system. Generator feeder differential current condition 302 is identified if there is a difference in the current levels measured at these two points.

In response to identifying generator feeder differential current condition 302 for more than time delay 304, the generator may be tripped (operation 306). For example, without limitation, time delay 304 may be on the order of approximately tens of milliseconds or another appropriate time period.

Over voltage transient protection condition 308 may be identified by measuring the voltage level at a distribution point in the power system. Over voltage transient protection condition 308 may be identified when voltage at the distribution point rises above a threshold voltage level as a result of loads being removed from the distribution point.

In response to identification of over voltage transient protection condition 308 for more than time delay 310 the generator may be tripped and the high voltage AC bus may be isolated (operation 312). For example, without limitation, time delay 310 may be on the order of approximately milliseconds or some other appropriate time period.

The generator and high voltage AC bus may be automatically reset when operation 312 is implemented in response to over voltage transient protection condition 308. However, this automatic reset may be disabled after the generator is tripped for the second time (operation 314) in response to over voltage transient protection condition 308.

Instant trip generator condition 316 may result from internal generator inconsistencies or inconsistencies in the generator that may affect voltage regulation or that may affect the generator controller in undesired ways. The generator may be tripped (operation 306) in response to identifying instant trip generator condition 316 for more than time delay 318. For example, without limitation, time delay 318 may be on the order of approximately milliseconds or another appropriate time period.

In accordance with an illustrative embodiment, the generator may be tripped and the high voltage AC bus isolated (operation 312) in response to identifying generator overcurrent greater than arcing threshold 320 for more than time delay 322. For example, arcing threshold may be on the order of approximately hundreds of amps or another appropriate current threshold level. For example, without limitation, time delay 322 may be on the order of hundreds of milliseconds or another appropriate time period.

In accordance with an illustrative embodiment, time delay 322 may be selected from shorter time delay 323 or longer time delay 325. Shorter time delay 323 may be used (operation 326) in response to manual fault reset 324. Otherwise, longer time delay 325 may be used. For example, without limitation, longer time delay 325 may be approximately a number of times longer than shorter time delay 323.

In accordance with an illustrative embodiment, the generator may not be tripped in response to identifying instant trip generator condition 316 if generator over current greater than arcing threshold 320 is identified, as indicated by AND operation 328.

In accordance with an illustrative embodiment, the generator may be tripped and the high voltage AC bus may be isolated in response to identifying generator over current greater than overload threshold 330 for more than time delay 332. For example, the overload threshold may be less than the arcing threshold used to identify generator over current greater than arcing threshold 320. For example, time delay 332 may be on the order of seconds or another appropriate time period. In any case, time delay 332 may be greater than time delay 322.

The generator may be tripped and the high voltage AC bus isolated (operation 312) in response to identifying generator DC content condition 334 for more than time delay 336. Generator DC content condition 334 may be identified by identifying the presence of DC content on the AC bus provided by the generator. For example, without limitation, time delay 336 may be on the order of hundreds of milliseconds or another appropriate time period. In any case, time delay 336 may be greater than time delay 322.

In response to identifying distribution feeder differential current condition 338 for more than time delay 340, a fault in the power system may be cleared downstream of the high voltage AC bus (operation 342). For example, without limitation, time delay 340 may be on the order of approximately tens of milliseconds or another appropriate time period. Similarly, a fault in the power system may be cleared downstream from the high voltage AC bus (operation 342) in response to identifying ground fault condition 344 for more than time delay 346. For example, without limitation, time delay 346 may be on the order of approximately milliseconds or another appropriate time period. In this example, distribution feeder differential current condition 338 and ground fault condition 344 are examples of other undesired conditions 348. Other undesired conditions 348 are undesired conditions in the power system that occur or are detected downstream from the high voltage AC bus in the power system.

Different threshold levels may be used to determine when a fault condition is identified, thereby starting a time delay, and for determining whether the fault condition persists for more than the time delay, to provide hysteresis in the fault condition protections described above. For example, a current exceeding a first threshold level may indicate an arc fault or an overload condition, thereby starting a time delay counter or other device or function for timing a selected time delay period. The current may be required to drop below a second threshold level, that is lower than the first threshold level, before the fault condition is identified as cleared, thereby interrupting the time delay before any further action is taken. In this case, if the current drops below the first threshold level, at which the timing of the time delay is started, but does not drop below the second threshold level before the time delay expires, appropriate action, such as tripping the generator, will be taken, as discussed above. If the current does drop below the second threshold level during the time delay period no such action will be taken.

Figure 4:
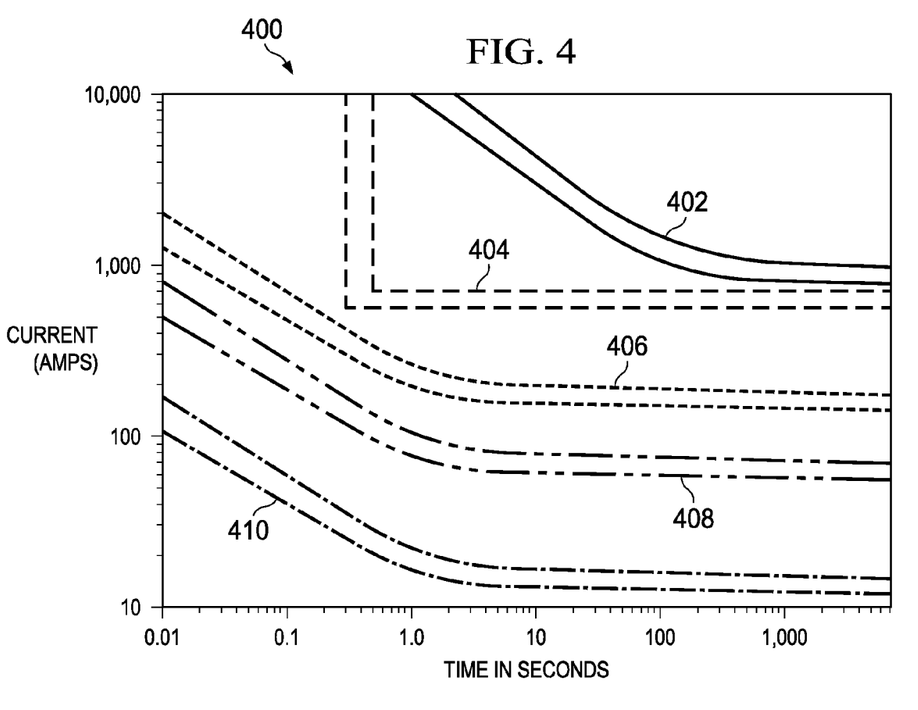
FIG. 4 is an illustration of power system protection coordination curves in accordance with an illustrative embodiment.

Turning now to FIG. 4, an illustration of power system protection coordination curves is depicted in accordance with an illustrative embodiment. In this example, curves 400 illustrate time delays with respect to current levels for responding to various undesired conditions in a power system. For example, curves 400 may be used by power system protection controller 120 in FIG. 1 or power system protection controller 254 in FIG. 2.

In this example, curves 402 are for conventional generator overcurrent conditions. Curves 404 are for arc fault overcurrent conditions. Curves 406 are for overcurrent conditions in a tie bus in the power system. Curves 408 are for overcurrent conditions in a distribution bus in the power system. Curves 410 are for controlling a circuit breaker for a load in the power system. Curves 402, 404, 406, 408, and 410 should not overlap in any region to preserve proper coordination and minimize the impact on loads.

In this example, each of curves 402, 404, 406, 408, and 410 includes two lines that define a band region. This band region reflects allowed variability in the time delay that may be implemented by various devices that may be used to trigger a response to various undesired conditions in the power system. For example, for a given current level, a contactor or circuit breaker may be opened, or other appropriate action taken, any time after a time delay that is indicated by the left of the two lines in the curve and before a time delay that is indicated by the right of the two lines in the curve.

Figure 5:
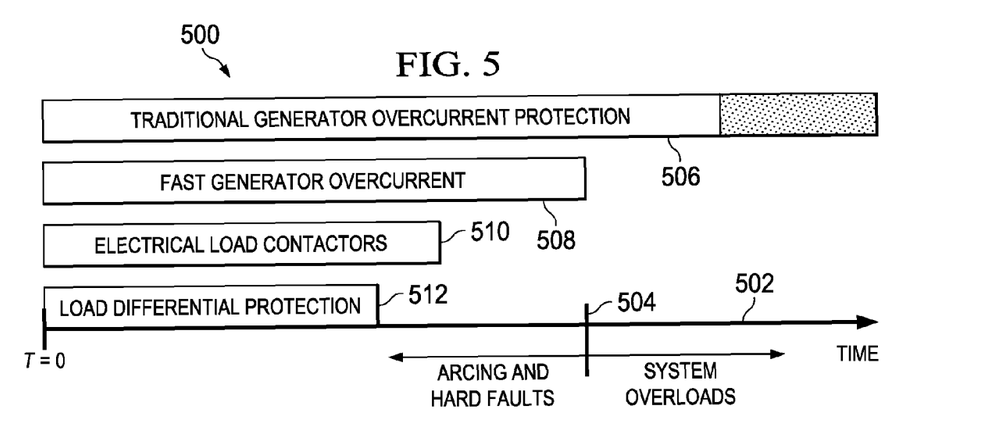
FIG. 5 is an illustration of fault protection clearing times in accordance with an illustrative embodiment.

Turning now to FIG. 5, an illustration of fault protection clearing times is depicted in accordance with an illustrative embodiment. In this example, relative fault protection clearing times 500 are shown with respect to time scale 502. Line 504 on time scale 502 indicates an approximate division of time scale 502 between arcing and hard faults and system overloads. In this example, relative clearing times for traditional generator overcurrent protection 506, fast generator overcurrent 508, electrical load contactors 510, and load differential protection 512 are shown.

Figure 6:
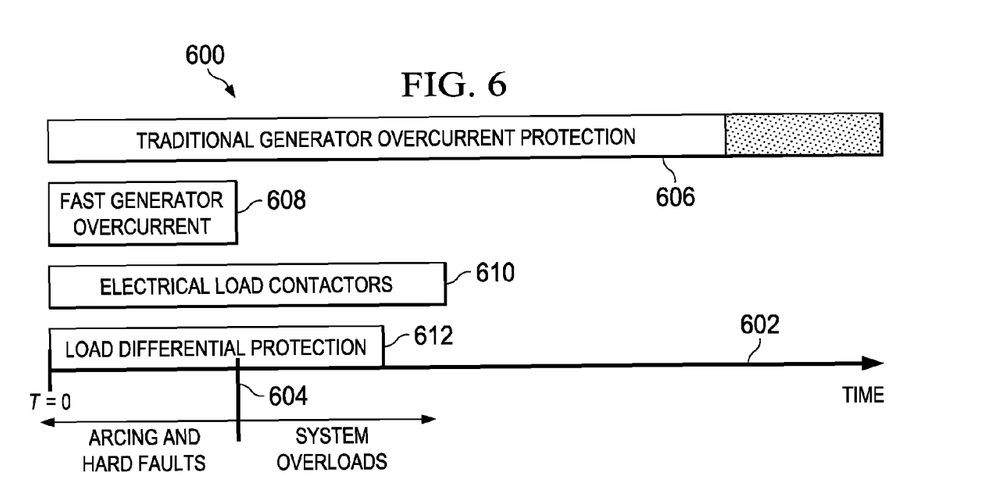
FIG. 6 is an illustration of fault protection clearing times following a manual reset action in accordance with an illustrative embodiment.

Turning now to FIG. 6, an illustration of fault protection clearing times following a manual reset action is depicted in accordance with an illustrative embodiment. In this example, relative fault protection clearing times 600 are shown with respect to time scale 602. Line 604 on time scale 602 indicates an approximate division of time scale 602 between arcing and hard faults and system overloads. In this example, relative clearing times for traditional generator overcurrent protection 606, fast generator overcurrent 608, electrical load contactors 610, and load differential protection 612 are shown. Note that in this example, fault protection clearing times for fast generator overcurrent 608 are shorter following a manual reset action than fast generator overcurrent clearing times 508 in FIG. 5.

The different illustrative embodiments thereby provide for safe operation of the power system on an aircraft in the event of undesired conditions in the power system, such as arc faults and other undesired conditions.

Power system protection in accordance with illustrative embodiments is robust. In accordance with the illustrative embodiments, normal transients in the power system may not result in false indications of undesired conditions. Therefore, such normal transients may not cause power system protection in accordance with the illustrative embodiments to interrupt power to the loads being powered by the power system.

Power system protection in accordance with the illustrative embodiments also is coordinated. This coordination ensures that only the area of the power system containing the cause of the undesired condition is isolated from the rest of the power system. Therefore, the number of loads affected by the response to the undesired condition is minimized and the number of available power sources is maximized.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for protecting a power system, comprising:
tripping a generator in response to identifying a current on the generator that is greater than a first current threshold for a first time delay;
tripping the generator in response to identifying the current on the generator that is greater than a second current threshold for a second time delay, wherein the first current threshold is larger than the second current threshold and the first time delay is shorter than the second time delay;
selecting a shorter time delay for the first time delay in response to identifying a manual reset of a fault in the power system; and
otherwise selecting a longer time delay for the first time delay, wherein the longer time delay is longer than the shorter time delay.

2. The method of claim 1, further comprising:
identifying a differential current condition on generator feeder lines providing power to the power system from the generator, wherein the differential current condition comprises a difference between a level of a first current at a first location on the generator feeder lines and a level of a second current at a second location on the generator feeder lines, wherein the first location is closer to the generator than the second location; and
tripping the generator in response to identifying the differential current condition on the generator feeder lines for more than a third time delay, wherein the third time delay is shorter than the first time delay.

3. The method of claim 2, wherein identifying the differential current condition on the generator feeder lines comprises:
sensing the first current at a location of the generator; and
sensing the second current at an input to a power distribution system, wherein the power distribution system is configured to distribute the power from the generator to the power system.

4. The method of claim 2 further comprising:
clearing a fault at a location in the power system between a power distribution system and a load in response to identifying an undesired condition at the location in the power system between the power distribution system and the load for more than a fourth time delay, wherein the fourth time delay is shorter than the first time delay.

5. The method of claim 4, wherein the undesired condition is selected from:

the differential current condition on load feeder lines providing power to the load; and a ground fault condition.

6. The method of claim 1, wherein the power system is the power system on an aircraft and the generator is the generator on the aircraft.

7. The method of claim 1, wherein the current on the generator that is greater than the first current threshold is an arc fault.

8. An apparatus comprising a power system protection controller configured to:
trip a generator in response to identifying a current on the generator that is greater than a first current threshold for a first time delay;
trip the generator in response to identifying the current on the generator that is greater than a second current threshold for a second time delay, wherein the first current threshold is larger than the second current threshold and the first time delay is shorter than the second time delay;
select a shorter time delay for the first time delay in response to identifying a manual reset of a fault in a power system; and
otherwise select a longer time delay for the second time delay, wherein the longer time delay is longer than the shorter time delay.

9. The apparatus of claim 8, wherein the power system protection controller is further configured to:
identify a differential current condition on generator feeder lines providing power to a power system from the generator, wherein the differential current condition comprises a difference between a level of a first current at a first location on the generator feeder lines and a level of a second current at a second location on the generator feeder lines, wherein the first location is closer to the generator than the second location; and
trip the generator in response to identifying the differential current condition on the generator feeder lines for more than a third time delay, wherein the third time delay is shorter than the first time delay.

10. The apparatus of claim 9 further comprising:
a first current sensor located at a location of the generator and configured to sense the first current; and
a second current sensor located at an input to a power distribution system and configured to sense the second current, wherein the power distribution system is configured to distribute the power from the generator to the power system.

11. The apparatus of claim 9, wherein the power system protection controller is further configured to clear a fault at a location in the power system between a power distribution system and a load in response to identifying an undesired condition at the location in the power system between the power distribution system and the load for more than a fourth time delay, wherein the fourth time delay is shorter than the first time delay.

12. The apparatus of claim 11, wherein the undesired condition is selected from:
the differential current condition on load feeder lines providing power to the load; and
a ground fault condition.

13. The apparatus of claim 8, wherein the generator is a generator on an aircraft and the apparatus is located on the aircraft.

14. The apparatus of claim 8, wherein the current on the generator that is greater than the first current threshold is an arc fault.

15. A method for protecting a power system, comprising:
identifying a current on a generator that is greater than a first current threshold, wherein the generator provides power for the power system;
selecting a shorter time delay for a time delay in response to identifying a manual reset of a fault in the power system, otherwise selecting a longer time delay for the time delay, wherein the longer time delay is longer than the shorter time delay; and
tripping the generator in response to identifying the current on the generator that is greater than the first current threshold for more than the time delay.

16. The method of claim 15 further comprising:
tripping the generator in response to identifying the current on the generator that is greater than a second current threshold for longer than a second time delay, wherein the second current threshold is lower than the first current threshold and the second time delay is longer than the longer time delay.

17. The method of claim 15 further comprising:
identifying a differential current condition on generator feeder lines providing the power to the power system from the generator, wherein the differential current condition comprises a difference between a level of a first current at a first location on the generator feeder lines and a level of a second current at a second location on the generator feeder lines, wherein the first location is closer to the generator than the second location; and
tripping the generator in response to identifying the differential current condition on the generator feeder lines for more than a third time delay, wherein the third time delay is shorter than the shorter time delay.

18. The method of claim 15 wherein the power system is the power system on an aircraft, the generator is the generator on the aircraft, and the manual reset of the fault in the power system is initiated on a flight deck of the aircraft.

19. An apparatus comprising a power system protection controller configured to:
identify a current on a generator that is greater than a first current threshold, wherein the generator provides power for a power system;
select a shorter time delay for a time delay in response to identifying a manual reset of a fault in the power system, otherwise select a longer time delay for the time delay, wherein the longer time delay is longer than the shorter time delay; and
trip the generator in response to identifying the current on the generator that is greater than the first current threshold for more than the time delay.

20. The apparatus of claim 19, wherein the power system protection controller is further configured to:
trip the generator in response to identifying the current on the generator that is greater than a second current threshold for longer than a second time delay, wherein the second current threshold is lower than the first current threshold and the second time delay is longer than the longer time delay.

21. The apparatus of claim 19, wherein the power system protection controller is further configured to:
identify a differential current condition on generator feeder lines providing the power to the power system from the generator, wherein the differential current condition comprises a difference between a level of a first current at a first location on the generator feeder lines and a level of a second current at a second location on the generator feeder lines, wherein the first location is closer to the generator than the second location; and trip the generator in response to identifying the differential current condition on the generator feeder lines for more than a third time delay, wherein the third time delay is shorter than the shorter time delay.

22. The method of claim 19, wherein the power system is the power system on an aircraft, the generator is the generator on the aircraft, and the manual reset of the fault in the power system is initiated on a flight deck of the aircraft.

* * * * *